(No Model.)
J. H. REED.
EDUCATIONAL APPLIANCE.
No. 446,468. Patented Feb. 17, 1891.
*Fig. 1.*
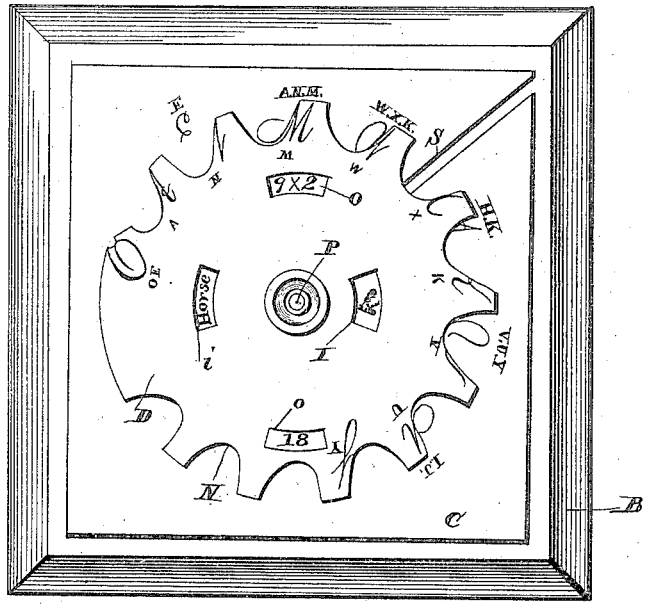
*Fig. 2.*
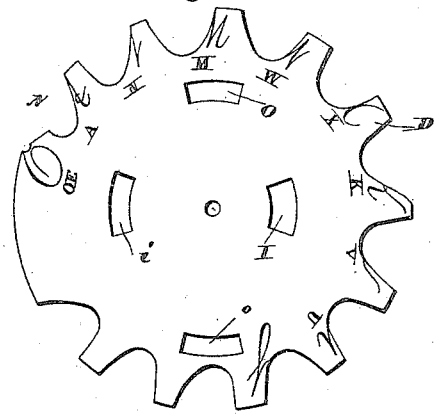
*Fig. 3.*
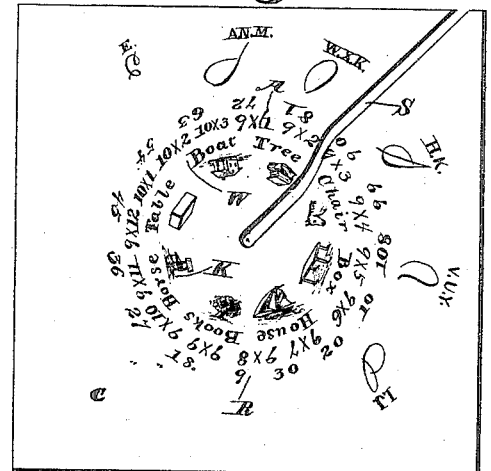
*Fig. 4.*
Witnesses
Samuel Ker
N. Collamer
Inventor
John H. Reed.
By his Attorneys,
C. A. Snow & Co.

UNITED STATES PATENT OFFICE.

JOHN H. REED, OF LANCASTER, WISCONSIN.

EDUCATIONAL APPLIANCE.

SPECIFICATION forming part of Letters Patent No. 446,468, dated February 17, 1891.

Application filed May 27, 1890. Serial No. 353,307. (No model.)

*To all whom it may concern:*

Be it known that I, JOHN H. REED, a citizen of the United States, residing at Lancaster, in the county of Grant and State of Wisconsin, have invented a new and useful Educational Appliance, of which the following is a specification.

This invention relates to stationery, and more particularly to apparatus for teaching writing or correct penmanship; and the object thereof is to provide an apparatus that will guide the youthful mind, first, in telling it the name of certain objects; secondly, in giving a complete multiplication table, and, thirdly, in teaching how to form written characters. These objects I accomplish by my apparatus, which consists, essentially, of a chart mounted upon a base and a disk pivoted to said base and turning above the chart thereon, said disk having apertures and said chart having pictures, figures, and characters thereon, all as hereinafter more fully described, and illustrated in the drawings, in which—

Figure 1 is a plan view of the complete apparatus. Fig. 2 is a plan of one of the disks. Fig. 3 is a plan of one of the charts. Fig. 4 is a cross-section showing the manner in which the charts are applied.

Referring to the said drawings, the letter B designates the base, which may be of wood, paper, or any other suitable material, and its size is such that it will extend beyond the edges of the disk D, which is centrally pivoted, as at P, to said base a slight distance above the same.

C is a chart, of which there may be any number, and this chart has a slot S extending from its edge to its center, whereby when the chart is brought into position its slot may be passed over the pivot P and its body may be made to register with the base, as shown in Fig. 1. In this position of parts it will be understood that the disk may be turned above the chart and base with the following results: The disk is also provided with an inner opening I, which is such distance from the pivot P that it will register with the circular row of pictures K and diametrically opposite this opening with another, (lettered i,) which will simultaneously register with one of the words in the row W. By arranging these words opposite the pictures which they describe it will be obvious that when the opening I stands over and exposes any certain picture on the chart the name thereof will be exposed in the correspondingly-opposite opening i, and the child will be thereby taught the name of the object which the picture represents. In this way the youthful mind can be educated at the same time that it is amused. The disk is also provided with an outer opening O, which is such distance from the pivot P that it will register with the circular row of additions, subtractions, multiplications, or divisions A, and diametrically opposite this opening with another, (lettered o,) which will simultaneously register with one of the numbers in the row R, which number will indicate the result of the arithmetical problem. By arranging these resulting numbers opposite the problems it will be obvious that when the opening O stands over and exposes any certain problem on the chart the result thereof will be exposed in the correspondingly-opposite opening o, and the child will be thereby taught his multiplication table. In this way the youthful mind will be further educated at the same time that it is amused with the ingenuity of the apparatus.

The charts are preferably so arranged that the addition table occurs on those charts having very short and common words, so that the smallest child will be instructed in those simple words and at the same time in the addition table, which is the first taught to children. In the same manner the subtraction table will follow with a trifle longer and harder words thereon, and the other tables and words in succession. In fact, after the multiplication table has been taught other branches of mathematics may be introduced—such as fractions and percentage—and still harder and more difficult words used in the same manner. The openings I and i are of course a slightly-different distance from the pivot P in order to bring them over the different rings of pictures and words, respectively, as also are the openings O and o for the same purpose, as will be clearly understood.

In the outer edge of the disk are formed notches N, and the right-hand side of each of these notches is marked with a portion of a script letter, either capital or small, the complete letter or letters being printed beneath the slot, as shown. The balance of the letter is marked on the chart C in such position that the disk can be turned to make the portion adjacent the notch complete the letter, and the latter is again printed on the chart outside the portion thereon, as also shown. In this way a great variety of letters can be made up, as will be understood. For instance, the capital stem is marked on the chart under the printed letters "A" "N" "M," and by turning the disk so that the portion at the notches printed with those letters registers properly each of the letters can be made up. Again, the capital loop is marked on the chart under the printed letters "W" "X" "K," and by turning the disk so that the portions at the notches printed with those letters registers properly each of the letters can be made up, and the child will be thereby taught the correct formation of written letters. In this way the youthful mind can be educated still further at the same time that it is pleased with the apparatus and amused at the numberless variations of letters that can be made therewith.

Following the plan above described the earlier charts are preferably marked with the small and simpler letters, and more advanced charts have the capitals and fancy letters. Indeed, other styles of lettering than script could be also taught by this system without departing from the spirit of my invention.

It will be obvious that charts and disks embodying but one of these three branches of education might be made, omitting the others, or that two or more branches might be taught in the same way. Music, astronomy, geography, botany, and other common-school lessons, as well as the higher branches of study—the sciences or the arts—could also be taught by printing in one ring a question and in another the answer thereto, the same as the word "Horse" describes the picture or the number "18" gives the answer of the example "9×2" in Fig. 1. By printing an English word in one ring and the foreign in another opposite the English languages could even be taught, all as will be clearly understood. The charts can of course be replaced at will, and they may be manufactured in large quantities and sold by the dozen relating to any study or branch, to be applied by the teacher to the base and in the manner described. By attaching the disk to its pivot by a set-screw, as shown, it also can be removed and replaced by other disks, and in this manner the notches can be used with other sets of charts to teach other types of writing, all without departing from the spirit of my invention in the least.

I claim as the salient features of my invention—

1. The herein-described educational appliance, the same comprising a base, disks each detachably pivoted at and above the center of said base, and charts detachably mounted upon said base and marked with characters and portions of letters around their centers, each disk having openings through which certain of said characters are visible simultaneously with certain others, and also having complementary portions of letters marked at its edge, the whole adapted to operate as set forth.

2. The herein-described educational appliance, the same comprising a base, disks each detachably pivoted at and above the center of said base, and charts marked with characters and portions of letters around their centers, each chart having a radial slot adapted to pass over said pivot and each disk having openings through which certain of said characters are visible simultaneously with certain others, and also having complementary portions of letters marked at its edge, the characters, words, and portions of letters on the charts and their corresponding disks progressing from simple instruction to the higher grades thereof, as set forth.

3. In an educational appliance, the combination, with the base B and the disk D, centrally pivoted to and above said base, said disk having notches N in its edge, with portions of letters marked alongside thereof and openings I i and O o at different distances from the pivot, of the chart C, removably inserted between the base and disk, said chart having marked thereon complementary portions of letters adapted to register with those on the disk, and pictures and names and examples and answers respectively adapted to register simultaneously with the openings in said disk, all substantially as and for the purpose set forth.

4. In an educational appliance, the combination, with the base B and the disk D, centrally pivoted to and above said base, said disk having openings I i and O o at different distances from the pivot, of the chart C, removably inserted between the base and disk, said chart having marked thereon pictures and names and examples and answers respectively adapted to register simultaneously with the openings in said disk, all substantially as and for the purpose set forth.

5. In an educational appliance, the combination, with the base B and the disk D, centrally pivoted to and above said base, said disk having notches N in its edge, with portions of letters marked alongside thereof, of the chart C, removably inserted between the base and disk, said chart having marked thereon complementary portions of letters adapted to register with those on the disks, all substantially as and for the purpose set forth.

6. In an educational appliance, the combination, with the base B and the disk D, centrally pivoted to and above said base, said disk having an opening I at one side of its center and a similar opening i diametrically opposite thereto, but more remote from the center, of the chart C between the base and disk, said chart being provided with a ring of pictures K, each registering with the inner opening I, and with a larger ring of words W, each registering with the outer opening $i$, the word exposed simultaneously with the picture being descriptive thereof, substantially as described.

7. In an educational appliance, the combination, with the base B and the disk D, centrally pivoted to and above the same, said disk having an opening O at one side of its center and a similar opening $o$ diametrically opposite thereto, but more remote from the center, of the chart C between the base and disk, said chart being provided with a ring of problems A, each registering with the inner opening O, and with a larger ring of results R, each registering with the outer opening $o$, the result exposed simultaneously with the problem being the answer thereto, substantially as described.

8. In an educational appliance, the combination, with the base B and the disk D, centrally pivoted to and above the same, said disk being smaller in diameter than the base, provided with notches N in its edge, marked on one side thereof with portions of letters, and printed below such notches with the letters of which those portions are parts, of the chart C between the disk and base and the same size as the latter, said chart being marked with the complementary portions of the letters on the disk and printed outside with the letters of which those portions are parts, substantially as described.

In testimony that I claim the foregoing as my own I have hereto affixed my signature in presence of two witnesses.

JOHN H. REED.

Witnesses:
W. A. JOHNSON,
JOHN CARTHEW.